United States Patent [19]

Hasegawa et al.

[11] Patent Number: 4,486,162

[45] Date of Patent: Dec. 4, 1984

[54] BLADDER HANDLING APPARATUS FOR A TIRE VULCANIZING MACHINE

[75] Inventors: Akira Hasegawa; Katsuyoshi Sakaguchi, both of Nagasaki, Japan

[73] Assignee: Mitsubishi Jukogyo Kabushiki Kaisha, Tokyo, Japan

[21] Appl. No.: 434,322

[22] Filed: Oct. 14, 1982

[30] Foreign Application Priority Data

Oct. 29, 1981 [JP] Japan .................. 56-160231[U]

[51] Int. Cl.³ .................. B29C 1/12; B29H 5/06; B29H 5/08
[52] U.S. Cl. ........................................ 425/48; 425/51
[58] Field of Search ............... 425/33, 36, 38, 43, 425/51, 52, 53, 49

[56] References Cited

U.S. PATENT DOCUMENTS 2,730,763  1/1956  Brundage.
3,396,221  8/1968  Balle et al. ............... 425/43 X
3,574,893  4/1971  Balle et al. ............... 425/33
3,584,335  6/1971  Ulm et al. ................ 425/36
3,640,653  2/1972  Laenen et al. ............ 425/33
3,846,058  11/1974  Yoshida et al. ........... 425/36 X Primary Examiner—Willard E. Hoag
Attorney, Agent, or Firm—Birch, Stewart Kolasch & Birch

[57] ABSTRACT

An improved bladder handling apparatus for a tire vulcanizing machine including an upper bladder holding unit adapted to move upward or downward so as to raise up or lower a bladder is disclosed. The improvement consists of providing connecting means which serve for operatively connecting both the upper and lower bladder holding units and also a stopper unit disposed on the lower end part of the connecting means for defining the upper positional limit of the upper bladder holding unit.

3 Claims, 8 Drawing Figures

BLADDER HANDLING APPARATUS FOR A TIRE VULCANIZING MACHINE

BACKGROUND OF THE INVENTION

The present invention relates to a bladder handling apparatus for a tire vulcanizing machine and more particularly to an improved bladder handling apparatus which ensures a correct upper positional limit for an upper bladder holding unit without danger of causing injury or damage to a seal member fitted onto an actuating cylinder.

As is well known, a green tire is vulcanized with the aid of a bladder made of rubber in a tire vulcanizing machine, the bladder being included in the green tire during vulcanization. A conventional bladder handling apparatus of the type which is constructed such that both upper and lower bladder handling units are adapted to move upward and downward while the upper bladder holding unit is guided by means of a center post and the lower bladder holding unit is guided within a base for the tire vulcanizing machine is disclosed in Japanese Laid-Open Patent NO. 37518/77 and is widely put to practical use.

FIGS. 1 and 2 illustrate the above conventional bladder handling apparatus. In the drawings, reference letter a designates a bladder made of rubber, reference letter b an upper bladder holding unit, reference letter c a center post, reference letter d a center post actuating cylinder and reference letter e a lower bladder holding unit. The latter unit is firmly mounted on the center post actuating cylinder d. Further, reference letter f designates a guide cylinder for guiding the lower bladder holding unit e, reference letter g a lower die half, reference letter h an upper die half, reference letter i does a lower dome, reference letter j an upper dome, reference letter k a green tire to be vulcanized, reference letter l a hydraulic actuating cylinder, reference letter m a piping through which thermal energy carrier for vulcanization flows, reference letter n a ball nose and reference letter p a loader shoe.

Prior to vulcanizing a green tire the hydraulic cylinder 1 is actuated so as to raise up the center post actuating cylinder d from the lowered position as illustrated in FIG. 1 to the elevated one in FIG. 2 and the latter is then actuated so as to allow the center post c to be extended. The green tire k to be vulcanized is previously disposed in the position as illustrated in FIG. 2 by means of the loader shoe p. Then, the bladder a is located opposite to the inner wall of the green tire k.

Next, a thermal energy carrier such as steam or the like is introduced into the bladder a by way of the piping m until the bladder a is expanded to such an extent as illustrated in the left half of FIG. 2. At this moment the upper bladder holding unit b engages the ball nose n. The loader shoe p of the loading apparatus is then disengaged from the green tire k and it is displaced to a position outside the bladder handling apparatus. Next, the upper die half h is tightly placed on the lower die half g in correct alignment with the latter and the thermal energy carrier is then introduced into the bladder a and both the upper and lower domes j and i while the domes are joined to one another in a gas tight manner, until the intended vulcanization is effected for the green tire k.

As described above, the conventional bladder handling apparatus is constructed such that while the upper die half is raised up steam is introduced into the bladder so as to expand the latter and carry out a preliminary forming process for the tire with the upper bladder holding unit raised up to the elevated position. Obviously, the upper positional limit of the upper bladder holding unit can be correctly controlled when a hydraulic cylinder is employed for the center post actuating cylinder d but it has been found that maintenance service is practiced only with much difficulty. For the purpose of effecting easy maintenance a pneumatic cylinder is employed for the conventional bladder handling apparatus. Accordingly, it has a drawback in that a higher steam pressure cannot be utilized because of free movement of the upper bladder holding unit caused by the resiliency of the pneumatic cylinder.

To obviate the above drawback there was proposed a modified bladder handling apparatus as illustrated in FIG. 3 which includes spacers a' and b' adapted to define the upper positional limit of the upper bladder holding unit during the expansion of the bladder f', the spacer b' allowing the upper chamber of the center post actuating cylinder c' to be in communication with the interior of the bladder f' therethrough. However, it has been found that there is a drawback of shortened running life of the seal member d' due to the arrangement that it is exposed directly to a high temperature thermal energy carrier in the bladder f'. It should be noted that in FIG. 3 reference letter e' designates an upper bladder holding member.

SUMMARY OF THE INVENTION

Thus, the present invention is intended to overcome the problems as described above with respect to the conventional bladder handling apparatuses. A bladder handling apparatus in accordance with the present invention includes an upper bladder holding unit adapted to move upward or downward so as to raise up or lower a bladder made of rubber with the improvement consisting of providing connecting means which serve for operatively connecting both the upper and lower bladder holding units and a stopper unit disposed on the lower end part of the connecting means for defining the upper positional limit of the upper bladder holding unit.

Hence, it is an object of the present invention to provide an improved bladder handling apparatus for a tire vulcanizing machine which ensures a correct upper positional limit of the upper bladder holding unit during the expansion of the bladder irrespective of the arrangement of a pneumatic cylinder which serves as a center post actuating cylinder.

It is another object of the present invention to provide an improved bladder handling apparatus for a tire vulcanizing machine which has eliminated any danger of causing an injury or damaage to a seal member fitted into the actuating cylinder due to exposure a high temperature thermal energy carrier for vulcanization.

Other objects and advantageous features of the present invention will become apparent from the reading of the following description made in conjunction with the accompanying drawings.

BRIEF DESCRIPTION OF DRAWINGS

The accompanying drawings will be briefly described below.

DETAILED DESCRIPTION

Figure 1:
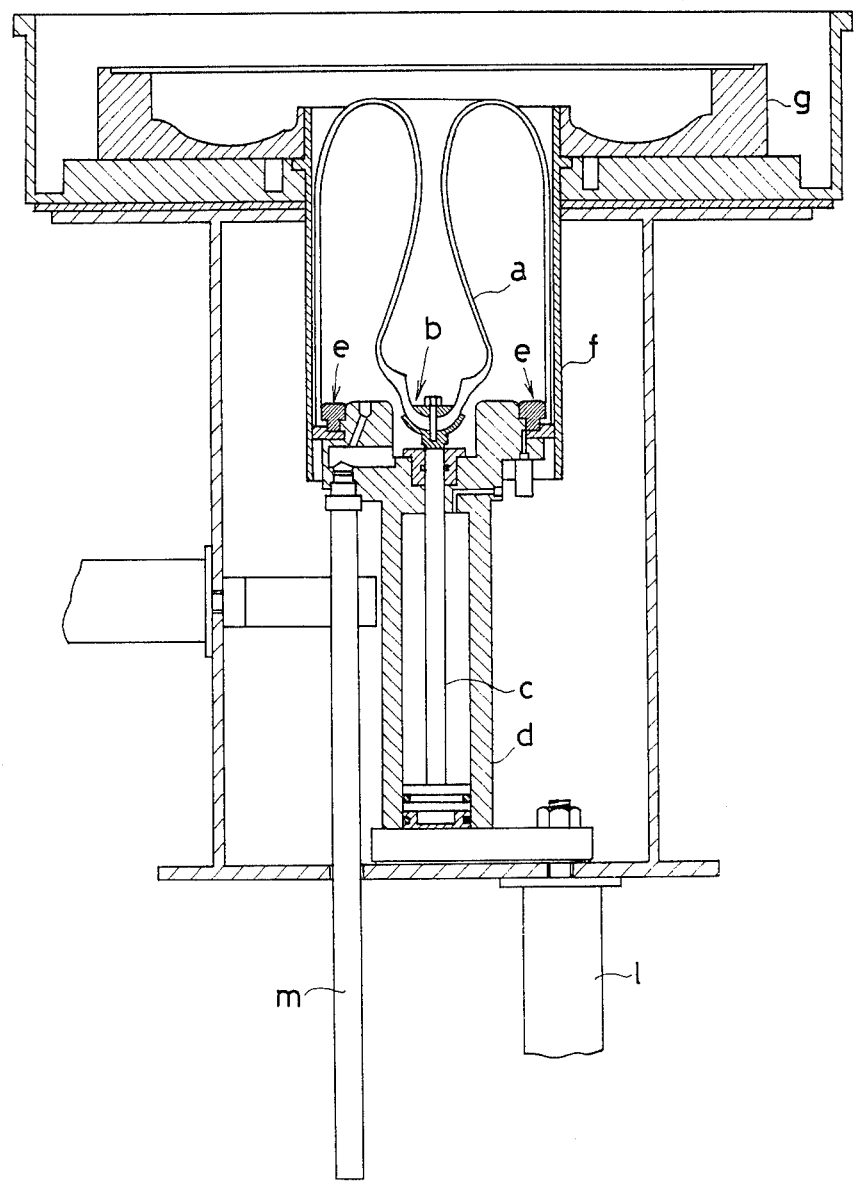
FIG. 1 is a vertical sectional view of a conventional bladder handling apparatus for a tire vulcanizing machine.
Figure 2:
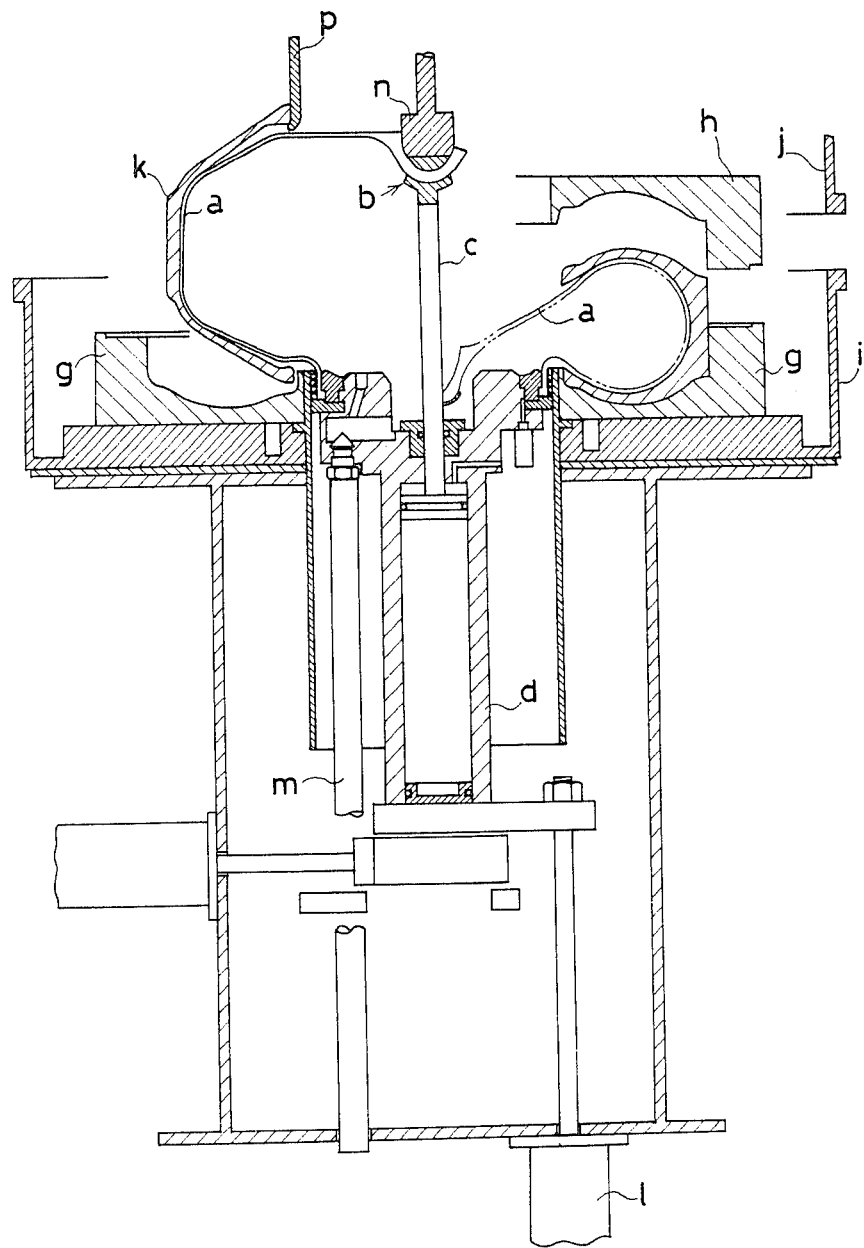
FIG. 2 is a vertical sectional view of a bladder handling apparatus similar to FIG. 1, wherein the left half of the drawing illustrates that a bladder is included in a tire to be vulcanized, while the right half of the same illustrates that the green tire with the bladder included therein is ready for being subjected to vulcanization.
Figure 3:
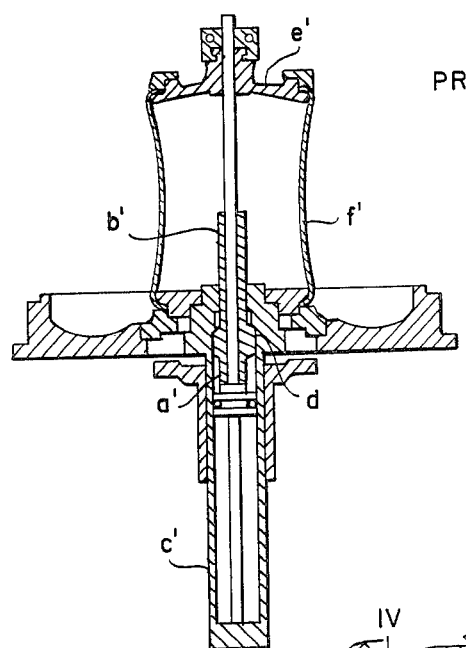
FIG. 3 is a partial vertical sectional view of another conventional bladder handling apparatus for a tire vulcanizing machine.

Now the present invention will be described in greater detail hereunder with reference to FIGS. 4 to 8 which illustrate a preferred embodiment of the invention.

In the illustrated embodiment reference numeral 1 designates a base for a tire vulcanizing machine, reference numeral 3 a lower die half and reference numeral 4 an upper die half. The lower die half 3 is mounted in a fixed position on base 1 over a dome or platen 2. The upper die half 4 is adapted to move upward away from and downward toward the lower die half. Reference numeral 5 designates a bladder guide cylinder which is fixed securely to the platen 2. Reference numeral 6 designates a lower ring which is fitted into the bladder guide cylinder 5 in such a manner as to move up and down along the inner wall of the bladder guide cylinder. Reference numeral 7 designates a lower holding ring fitted onto the upper end of the lower ring 6 and reference numeral 8 a hub ring. Reference numeral 9 designates a bladder of which the lower end part is tightly held between the inner face of the lower holding ring 7 and the outer face of the hub ring 8. It should be noted that the hub ring 8 moves up and down together with the lower ring 6 during normal operation of the tire vulcanizing machine but it is disconnected from the lower ring 6 when the used bladder 9 is replaced with a new one.

The hub ring 8 includes a cylinder 10 secured to the central part of the bottom thereof and a piston rod 13 of the cylinder 10 extends upward through a packing 11 and a packing retainer 12. An upper holding ring 14 is screwed on the upper thread part of the piston rod 13 and an upper bladder retainer 16 is engaged to the upper holding ring 14 by means of a bolt 15 so that the upper central part of the bladder 9 is tightly held between both the upper holding ring 14 and the upper bladder retainer 16.

Further, the hub ring 8 is provided with a pair of elongated cylinders 17 so as to receive the lower part of a spacer rod 18 of which the lower threaded end is fitted with a nut 19 together with a lower stopper 20.

Figure 8:
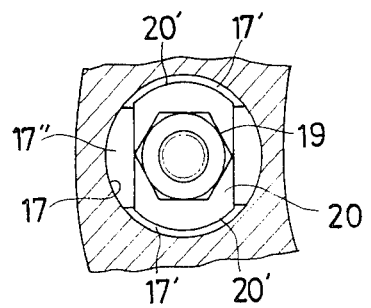
FIG. 8 is a partial cross-sectional view of the apparatus taken in line VI—VI in FIG. 4.

As is best seen from FIG. 8, the lower stopper 20 has arched parts 20' located opposite to one another, the arched parts 20' serving to prevent the spacer rod 18 from being disengaged from the cylinder 17 when they come in abutment against the upper flange portion 17' of the cylinder 17. If it is required to disengage the spacer rod 18 from the cylinder 17, both the spacer rod 18 and the lower stopper 20 are made to turn 90 degrees from the position as illustrated in FIG. 8 so that the lower stopper 20 passes through a rectangular hole 17".

Figure 6:
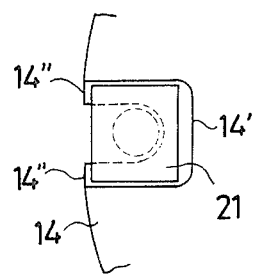
FIG. 6 is a partial cross-sectional view of the upper bladder holding unit taken in line IV—IV in FIG. 4, shown in an enlarged scale.
Figure 7:
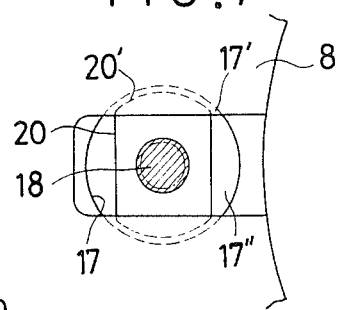
FIG. 7 is a partial cross-sectional view of the apparatus taken in line V—V in FIG. 4.

Further, each of the spacer rods 18 includes an upper stopper 21 having a square configuration, the upper stopper 21 being formed integral with the upper end of the respective spacer rod 18. As illustrated in FIG. 6, the upper stopper 21 is fitted into a rectangular groove 14' so that disengagement of the upper stopper 21 from the latter is prevented by abutment of both the sides of the upper stopper 21 against the lower shoulder face 14" of the rectangular groove 14'.

Next, operations of the bladder handling apparatus for the tire vulcanizing machine will be described below.

A required position of the lower stopper 20 on the spacer rod 18 is first determined by rotating the nut 19 so that an upper positional limit of the upper bladder holding unit comprising the upper holding ring 14, the bolt 15 and the upper bladder retainer 16 is selectively determined for the bladder 9 which is to be subjected to preliminary tire forming. The spacer rod 18 is then inserted through the rectangular hole 17" into the cylinder 17 together with the lower stopper 20 and thereafter the spacer rod 18 and the lower stopper 20 are caused to turn by 90 degrees so that the arched parts 20' of the lower stopper 20 comes in engagement with the flange portion 17' of the cylinder 17 so as to prevent the spacer rod 18 from being disconnected from the cylinder 17. Next, the upper stopper 21 at the upper end of the spacer rod 18 is fitted into the rectangular groove 14' of the upper holding ring 14 by way of tilting the spacer rod 18 outward within the extent as defined by the clearance between the cylinder 17 and the spacer rod 18, and then allowing the rod 18 to resume the original vertical posture. Thus, the hub ring 8 is operatively connected to the upper holding ring 14 via the spacer rods 18 so that they move up and down together.

Next, the upper central part of the bladder 9 is tightly held by means of a combination of the upper holding ring 14 and the upper bladder retainer 16, whereas the lower part of the bladder 9 is also tightly held by means of another combination of the hub ring 8 and the lower holding ring 7. A series of preparative operations are completed.

Figure 4:
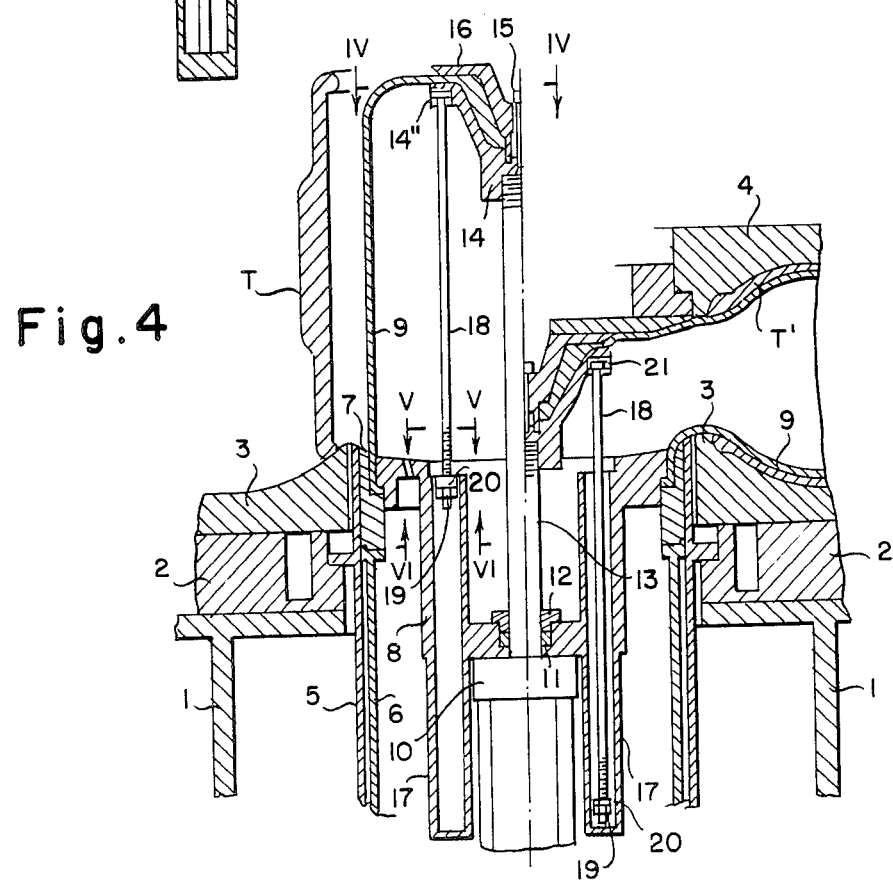
FIG. 4 is a vertical sectional view of a bladder handling apparatus for a tire vulcanizing machine in accordance with an embodiment of the present invention, wherein the left half of the drawing illustrates that a piston rod is raised up to the uppermost position, while the right half of the same illustrates that the piston rod is lowered to the lowermost position.
Figure 5:
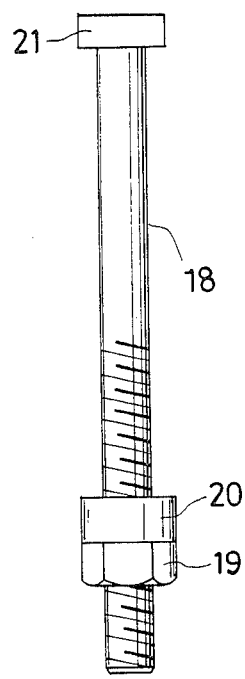
FIG. 5 is a side view of a connecting member in the form of a connecting rod.

Next, a green tire T to be vulcanized is located outside the bladder 9 in a spaced relationship as illustrated in the left half of FIG. 4, and the bladder 9 is then expanded by introducing high pressure steam thereinto. Thus the spacer rod 18 is elevated, an upper positional limit of the upper holding unit comprising the upper holding ring 14, the bolt 15 and the upper bladder retainer 16 is correctly controlled by abutment of the lower stopper 20 of the spacer rod 18 against the flange portion 17' of the cylinder 17. After it is confirmed that the preparative forming process is completed for the green tire T the upper die half 4 is lowered, as illustrated in the right half of FIG. 4, until it is placed on the lower die half 3 in correct alignment with the latter. Then, a thermal energy carrier for vulcanization is introduced into the bladder 9 so that the green tire T' is subjected to vulcanization.

After completion of the required vulcanization the upper die half 4 is raised up, the vulcanized tire T' is removed from the bladder 9 and the lower die half 3 and it is then transferred to a certain position located outside the tire vulcanizing machine. After it is confirmed that the bladder 9 and both the upper and lower die halves 3 and 4 are correctly maintained, the next green tire T to be vulcanized is placed on the lower die half 3 in the same manner as in the foregoing, and the above steps of operations are repeated.

In the illustrated embodiment the required position of the lower stopper 20 is adjusted by rotating the nut 19. Alternatively, a plurality of spacer rods 18 having a different length are available for each size of tires to be vulcanized. Further, in the illustrated embodiment the position of the lower stopper 20 is adjusted by way of the steps of disengaging the spacer rod 18 from the elongated cylinder 17, and then rotating nut 19. Alternatively, the position of the lower stopper 20 may be adjusted by way of the steps of fitting the nut 19 and the lower stopper 20 into the elongated cylinder 17 in such a manner that they are not rotated, and then rotating the spacer rod 18 at its upper part. Further, in the illustrated embodiment the spacer rods 18 are disposed on both the sides of the piston rod 13. Alternatively, the spacer rods 18 may be replaced with a single cylinder which is disposed around the piston rod 13 in a coaxial relation. It is preferred that each of the elongated cylinders 17 has a drain discharge hole at its lower end and a piping extending from the drain discharge hole is equipped with a control valve so as to ensure correct discharge of condensed water.

Since the bladder handling apparatus of the invention is constructed such that the upper holding unit comprising the upper holding ring 14, the bolt 15 and the upper bladder retainer 16 is operatively connected to the lower holding unit comprising the lower holding ring 7 and the hub ring 8 by way of the connecting members 18 in the form of spacer rods so that they move up and down together, and each of the connecting members 18 are fitted with the stopper unit comprising the nut 19, the lower stopper 20 and the upper stopper 21 for ensuring an upper positional limit for the upper holding unit, a correct upper positional limit is ensured for the upper holding unit comprising the upper holding ring 14, the bolt 15 and the upper bladder retainer 16 during expansion of the bladder even when a pneumatic cylinder is employed for the bladder handling apparatus. Further, since the connecting members 18 are located within the bladder 9 and no communication is provided between the bladder 9 and the cylinder 10, there is no danger of causing injury or damage to the seal member fitted about the cylinder 10 due to exposure to high temperature fluid for vulcanization.

The invention being thus described, it will be obvious that the same may be varied in many ways. Such variations are not to be regarded as a departure from the spirit and scope of the present invention, and all such modifications as would be obvious to one skilled in the art art intended to be included within the scope of the following claims.

What is claimed is:

1. A bladder handling apparatus for a tire-vulcanizing machine comprising in combination a center post vertically penetrating a center of a lower bladder holding unit, an upper bladder holding unit attached to an upper end of said center post, a fluid-pressure actuator serving to move said center post up and down, thereby raising and lowering said upper bladder holding unit, at least one spacer rod extending from said upper bladder holding unit having a lower threaded end inserted in said lower bladder holding unit and a nut-stopper combination fitted onto said lower threaded end of said at least one rod engageable with said lower bladder holding unit, thereby controlling the limit of elevation of said upper bladder holding unit.

2. A bladder handling apparatus as disclosed in claim 1, wherein a plurality of spacer rods are provided at equal intervals concentrically around said center post.

3. A bladder handling apparatus as disclosed in claim 1, wherein said at least one spacer rod is adapted to be raised or lowered in a receiving cylinder.

* * * * *